United States Patent
Celebi et al.

(10) Patent No.: US 8,064,836 B1
(45) Date of Patent: Nov. 22, 2011

(54) COGNITIVE RADIO TRANSCEIVER FOR DISPERSED SPECTRUM UTILIZATION

(75) Inventors: Hasari Celebi, Tampa, FL (US); Huseyin Arslan, Tampa, FL (US)

(73) Assignee: University of South Florida, Tampa, FL (US)

( * ) Notice: Subject to any disclaimer, the term of this patent is extended or adjusted under 35 U.S.C. 154(b) by 400 days.

(21) Appl. No.: 12/422,596

(22) Filed: Apr. 13, 2009

Related U.S. Application Data (60) Provisional application No. 61/123,810, filed on Apr. 11, 2008.

(51) Int. Cl.
H04B 15/00 (2006.01)
(52) U.S. Cl. ............................ 455/62; 455/63.3; 455/65
(58) Field of Classification Search .................... 455/62, 455/63.3, 65
See application file for complete search history.

(56) References Cited

U.S. PATENT DOCUMENTS

| | | | | |
|---|---|---|---|---|
| 6,215,982 B1* | 4/2001 | Trompower | ................. | 455/63.3 |
| 6,219,561 B1* | 4/2001 | Raleigh | ........................ | 455/561 |
| 7,426,386 B1* | 9/2008 | Yousefi et al. | ................ | 455/429 |

OTHER PUBLICATIONS

Mitola, Maguire; Cognitive Radio: Making Software Radios More Personal; IEEE Personal Communications; Aug. 1999; 13-18; IEEE.
Haykin; Cognitive Radio: Brain-Empowered Wireless Communications; IEEE Journal on Selected Areas in Communications; Feb. 2005; 201-220; vol. 23, No. 2; IEEE.
Xing, Chandramouli, Mangold, Shankar; Dynamic Spectrum Access in Open Spectrum Wireless Networks; IEEE Journal on Selected Areas in Communications; Mar. 2006; 626-637; vol. 24, No. 3; IEEE.
Celebi, Arslan; Ranging Accuracy in Dynamic Spectrum Access Networks; IEEE Communications Letters; May 2007; 405-407; vol. 11, No. 5; IEEE.
Celebi, Arslan; Enabling location and environment awareness in cognitive radios; Elsevier B.V.; 1114-1125, Jan. 2008.
Gezici, Celebi, Poor, Arslan; Fundamental Limits on Time Delay Estimation in Dispersed Spectrum Cognitive Radio Systems; IEEE Transactions on Wireless Communications; Jan. 2009; 78-83; vol. 8, No. 1; IEEE.
Chiang, Rowe, Sowerby; A Quantitative Analysis of Spectral Occupancy Measurements for Cognitive Radio; 3016-3020; IEEE May 25, 2009.
Celebi, Arslan; Cognitive Positioning Systems; IEEE Transactions on Wireless Communications; Dec. 2007; 4475-4483; vol. 6, No. 12; IEEE.
Weiss, Jondral; Spectrum Pooling: An Innovative Strategy for the Enhancement of Spectrum Efficiency; IEEE Radio Communications; Mar. 2004; S8-S14; IEEE.
Brandes, Cosovic, Schnell; Sidelobe Suppression in OFDM Systems by Insertion of Cancellation Carriers; 152-156; IEEE, May 25, 2009.
Brandes, Cosovic, Schnell; Reduction of Out-of-Band Radiation in OFDM Based Overlay Systems; 662-665; IEEE, May 25, 2009.
Mahmoud, Arslan; Spectrum Shaping of OFDM-based Cognitive Radio Signals; 113-116; IEEE, May 25 , 2009. Qi; Wireless Geolocation in a Non-Line-Of-Sight-Environment; Thesis; Nov. 2003; Princeton University.

* cited by examiner

*Primary Examiner* — Hai L Nguyen
(74) *Attorney, Agent, or Firm* — Molly L. Sauter; Smith & Hopen, P.A.

(57) ABSTRACT

In accordance with the present invention, a system and method that exploits the efficiency of the spectrum utilization is provided. The proposed technique, which is referred to as dispersed spectrum utilization, is based on the idea of transmitting the information over multiple dispersed bands in contrast to the current wireless communication systems which transmit the signal over a single band. A cognitive radio transceiver is developed for the implementation of this dispersed spectrum utilization technique.

18 Claims, 6 Drawing Sheets

COGNITIVE RADIO TRANSCEIVER FOR DISPERSED SPECTRUM UTILIZATION

CROSS REFERENCE TO RELATED APPLICATIONS

This application claims priority to currently pending U.S. Provisional Patent Application No. 61/123,810, filed Apr. 11, 2008.

BACKGROUND OF THE INVENTION

Spectrum is one of the most costly, on-demand and important resources for wireless communication systems. Cognitive radio has the capability to exploit the utilization of the spectrum by using the available empty spectrum holes temporarily, in an opportunistic manner. The available spectrum can be in the form of a single band (i.e. whole spectrum) or multiple dispersed bands (i.e. dispersed spectrum). Cognitive radio systems currently known in the art utilize the spectrum, for a single user, employing whole spectrum techniques.

Figure 1:
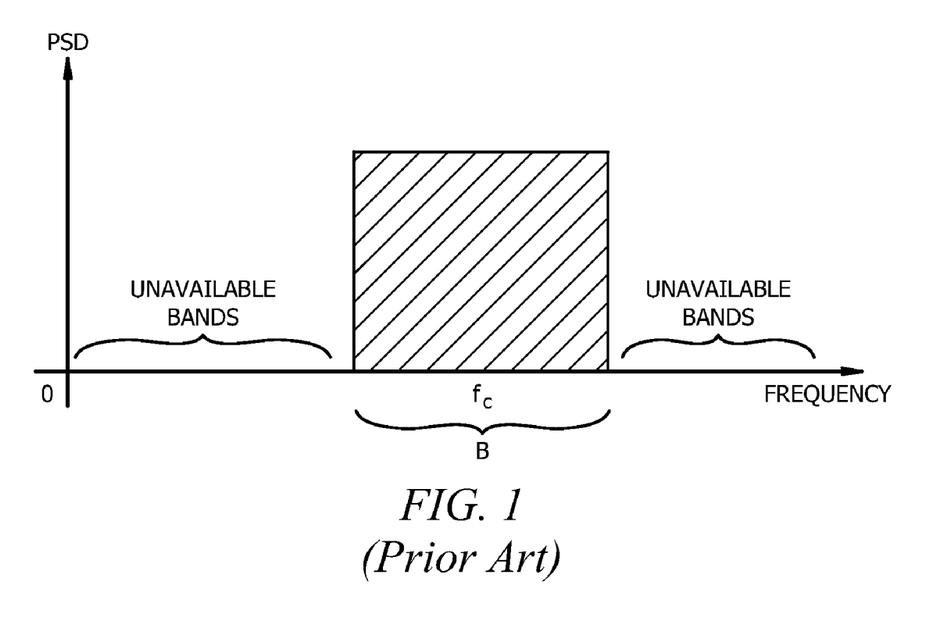
FIG. 1 is a diagrammatic view of whole spectrum utilization in a cognitive radio system as known in the prior art.
Figure 2:
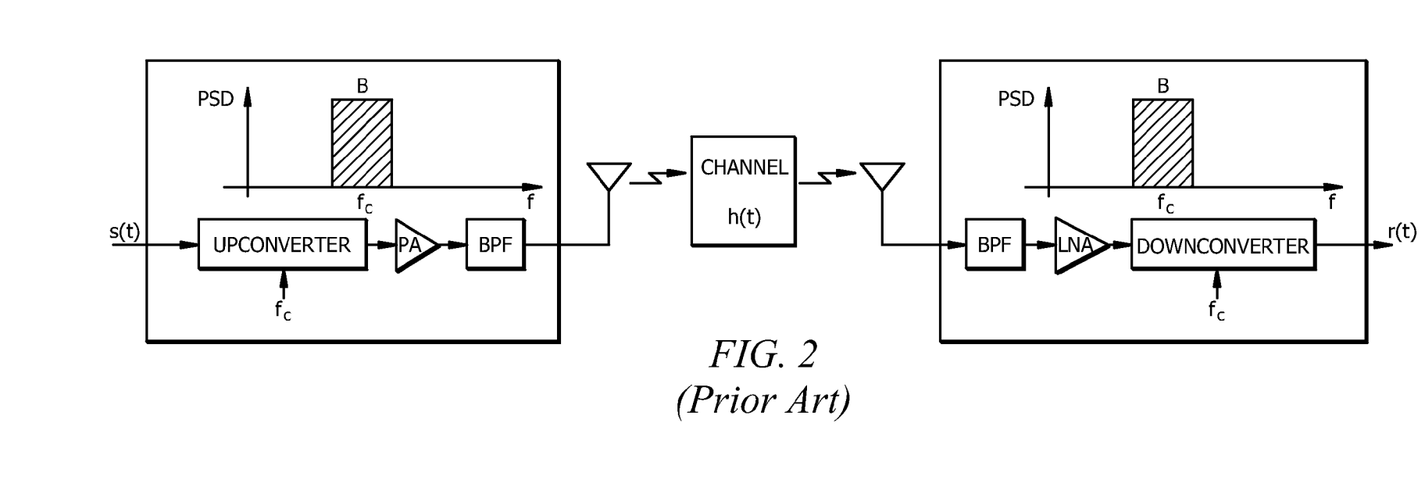
FIG. 2 is a block diagram of a cognitive radio transceiver for whole spectrum utilization as known in the prior art.

In the whole spectrum utilization approach for cognitive radio, the transmit signal occupies a single band as illustrated with reference to FIG. 1. For the whole spectrum utilization system, the baseband signal is processed over a single branch. The baseband transmit signal with absolute bandwidth in the whole spectrum utilization method occupies a whole band. As illustrated with reference to FIG. 2, the baseband signal s(t) is upconverted to the desired carrier frequency, $f_c$, amplified, filtered and then transmitted over the channel. At the receiver side, the received signal is filtered out using a bandpass filter (BPF) with bandwidth of $B_{wh}$ and downconverted to the baseband.

In prior art systems, the received signal is considered as an orthogonal frequency division multiplexing (OFDM) signal with zero coefficients at the sub-carriers corresponding to the unused bands. Then, the signal can be processed as in a conventional OFDM receiver. However, the available spectrum can be very dispersed in some cases, which requires processing of very large bandwidths if the signal is considered as a single OFDM signal.

Accordingly, what is needed in the art is an improved cognitive transceiver and method of use that does not require the processing of large bandwidths. Such a cognitive transceiver would result in a more efficient communication system.

SUMMARY OF INVENTION

In accordance with the present invention, a system and method are provided that allow for an alternative way of utilizing the spectrum and exploiting the efficiency of the spectrum utilization. The technique in accordance with the present invention is referred to as "dispersed spectrum utilization technique".

In accordance with the present invention, a method for dispersed wireless spectrum utilization in a cognitive radio transceiver is provided, including the steps of: selecting a plurality of dispersed bands in a wireless spectrum over which to transmit a baseband signal, each of the plurality of dispersed bands having an associated carrier frequency; upconverting the baseband signal to the carrier frequency associated with each of the plurality of dispersed bands; amplifying each of the upconverted baseband signals; filtering each of the amplified, upconverted baseband signals; combining the filtered, amplified, upconverted baseband signals; transmitting the combined signal over a single wideband antenna; receiving the combined signal from the single wideband antenna; splitting the received signal into a plurality of baseband receive signals, each baseband receive signal associated with one of each of the plurality of selected available dispersed bands; filtering each of the plurality of receive signals; amplifying each of the plurality of filtered receive signals; downconverting each of the plurality of amplified, filtered receive signals; combining the downconverted, amplified, filtered receive signals to recover the transmitted baseband signal.

The plurality of dispersed bands used in the present invention may be adjacent to, or non-adjacent to, each other.

In an additional embodiment of the present invention, a cognitive radio transceiver for dispersed wireless spectrum utilization is provided, including: a transmitter comprising a plurality of branches, each of the plurality of branches associated with one of each of a plurality of available dispersed bands in a dispersed wireless spectrum, each of the plurality of branches comprising; an upconverter for upconverting a received baseband signal to the carrier frequency associated with the branch; a transmitter amplifier for amplifying the upconverted baseband signal; and a transmitter bandpass filter for filtering the amplified, upconverted baseband signal; a transmitter combiner for combining each of the filtered, amplified, upconverted baseband signals from each of the plurality of branches into a combined signal; a transmitter for transmitting the combined signal over a single wideband antenna; a splitter for receiving the combined signal and for splitting the combined signal into a plurality of baseband receive signals, each of the plurality of baseband receive signals associated with one of each of the plurality of available dispersed bands; a receiver for receiving the plurality of baseband receive signals from the splitter, the receiver comprising a plurality of branches, each of the plurality of branches associated with one of each of the plurality of available dispersed bands in the dispersed wireless spectrum, each of the plurality of branches comprising; a receiver bandpass filter for filtering the baseband receive signal; a receiver amplifier for amplifying the filtered receive signal; and a downconverter for downconverting the plurality of amplified, filtered receive signal; a receiver combiner for combining the downconverted, amplified, filtered receive signals from each of the plurality of branches to recover the transmitted baseband signal.

The present invention provides a cognitive radio transceiver for the implementation of a dispersed spectrum utilization technique. Since the spectrum is one the most valuable resource for wireless communication systems, the benefits and applications of this invention are numerous. The present invention can increase the revenue of spectrum regulation agencies as well as the service providers. Furthermore, it can improve the performance of all type of wireless communication systems including personal, commercial, military and governmental systems.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 3:
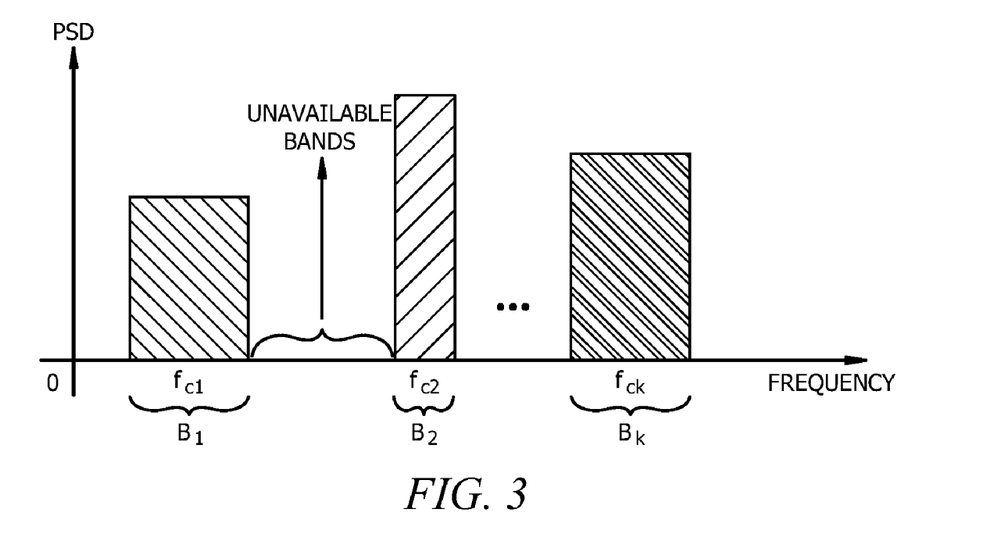
FIG. 3 is a diagrammatic view of dispersed spectrum utilization in a cognitive radio system in accordance with the present invention.

In the present invention, information is transmitted over multiple available dispersed bands. As shown with reference to FIG. 3, available dispersed bands are bands which are available for transmission, but are not necessarily contiguous within the wireless spectrum. FIG. 3 illustrates three dispersed bands, $B_1$, $B_2$ and $B_K$, each having an associated carrier frequency $fc_1$, $fc_2$, $fc_K$, respectively. As shown, the three available dispersed bands are separated by unavailable bands.

In the dispersed spectrum utilization technique of the present invention, information is transmitted over multiple dispersed bands in contrast to the prior art wireless communication systems, which transmit the information over a single band. The present invention provides for a cognitive radio transceiver for the implementation of the dispersed spectrum utilization technique.

Advanced and intelligent wireless communications and positioning devices, systems and applications that exploits the utilization of the spectrum efficiently can be developed using this invention. For instance, intelligent wireless communication devices can be developed. Such devices can interact with the environment and the user to learn the characteristics of the environment and the user's behavior and then adapt themselves accordingly. In addition, advanced location-based services and positioning systems for the personal, commercial, government, and military applications can be developed using this invention.

Figure 4:
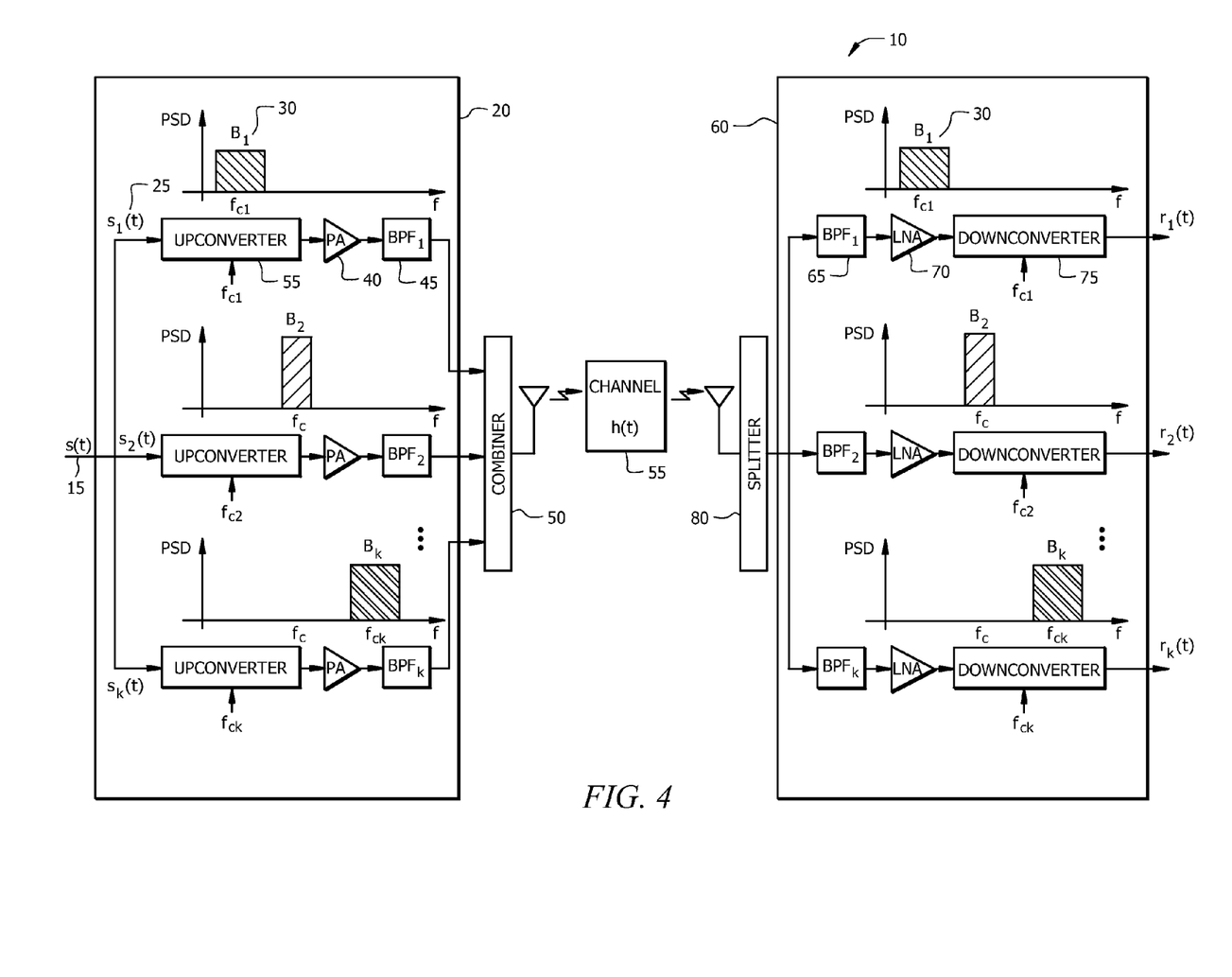
FIG. 4 is a block diagram of a cognitive radio transceiver for dispersed spectrum utilization in accordance with the present invention.

The present invention provides a cognitive radio transceiver in which the baseband signal s(t) is transmitted over a dispersed spectrum occupying K available bands. The block diagram of cognitive radio transceiver 10 employing a dispersed spectrum utilization technique is illustrated with reference to FIG. 4. In the transmitter side 20, the transmit baseband signal s(t) 15 at ith branch $s_i(t)$ is upconverted to the corresponding carrier frequency $f_{ci}$ and then amplified and filtered out. For example, the transmit signal $s_1(t)$ 25 at the branch corresponding to bandwidth $B_1$ 30 in the dispersed spectrum is upconverted by an upconverter 35 to frequency $f_{c1}$. The upconverted signal is amplified by a power amplifier 40 and then filtered using a bandpass filter $BPF_1$ 45. This process is repeated on the baseband signal 15 for each of the K branches corresponding to each of the available dispersed bands ($B_1$, $B_2$ . . . $B_K$). The RF signal resulting from each branch is combined 50 and transmitted through a single antenna 55 as shown in FIG. 4.

At the receiver side, the received signal is split 80 into K branches and the signal in each band is processed by the corresponding branch. In other words, each branch filters, amplifies, and downconverts the received signal to the baseband. For example, at a first branch corresponding to band $B_1$ 30, the received signal is filtered using a bandpass filter $BPF_1$ 65 and then amplified using a low-noise amplifier 70. The received signal is then downconverted to the baseband using a downconverter 75. The baseband representation of receive signal r(t) is given $$r(t)=\alpha s(t-\tau)+n(t), \quad (1)$$

where $\alpha$ and $\tau$ are the path coefficient and delay, respectively, and n(t) is independent white Gaussian noise with spectral density of $\sigma^2$.

In order to compare the performance whole spectrum utilization technique with the performance of dispersed spectrum utilization technique, it is assumed that the transmit signal for both techniques experience the same channel. Without loss of generality, a singlepath flat fading channel is considered for the analysis. As a result, the transmit signals for both techniques are assumed to be narrowband signals (e.g. <1 MHz).

In the present invention, the baseband representation of the received signal at ith branch $r_i(t)$ is given $$r_i(t)=\alpha s_i(t-\tau)=n_i(t), \quad (2)$$

where $n_i(t)$ is independent white Gaussian noise with spectral density of $\sigma_i^2$.

Let $\theta=[\tau\alpha]$ represent the vector of unknown signal parameters. Assuming that the signals are observed over the interval [0, T], the log-likelihood function for $\theta$ can be expressed as, $$\Lambda(\theta) = c_1 - \frac{1}{2\sigma^2}\int_0^T [r(t) - \alpha s(t-\tau)]^2 dt, \quad (3)$$

where $c_1$ represents a constant that is independent of $\theta$. Then, the maximum likelihood (ML) estimate for $\theta$ can be obtained from (3) as $$\hat{\theta}_{ML} = \arg\max_\theta \frac{1}{\sigma^2}\int_0^T [r(t) - \alpha s(t-\tau)]^2 dt - \frac{E\alpha^2}{2\sigma^2}, \quad (4)$$

where $$E = \int_0^T [s(t-\tau)]^2 dt$$

is the signal energy.

From (3), the Fisher information (FIM) can be obtained, after some manipulation, as $$I_\theta = \begin{bmatrix} I_{\tau\tau} & I_{\tau\alpha} \\ I_{\alpha\tau} & I_{\alpha\alpha} \end{bmatrix} \quad (5)$$

where the elements of Fisher Information Matrix (FIM) are given $$I_{\tau\tau} = \gamma \tilde{E}, \tag{6}$$

$$I_{\tau\alpha} = I_{\alpha\tau} = -\frac{\alpha \hat{E}}{\sigma^2}, \tag{7}$$

$$I_{\alpha\alpha} = \frac{E}{\sigma^2}, \tag{8}$$

where $\gamma = \alpha^2/\sigma^2$, $\tilde{E}$ and $\hat{E}$ are given $$\tilde{E} = \int_0^T [s'(t-\tau)]^2 \, dt, \tag{9}$$

$$\hat{E} = \int_0^T s'(t-\tau)s(t-\tau) \, dt. \tag{10}$$

From the first row and column element of the inverse FIM, i.e. $[I_\theta^{-1}]$, the CRLB for unbiased delay estimators can be obtained as $$CRLB_{wh} = \frac{1}{\gamma(\tilde{E} - \hat{E}^2/E)}. \tag{11}$$

If the channel coefficients are known, the unknown parameter vector reduces to $\tau$. Then the CRLB can be obtained from (5) as $$CRLB_{wh} = \frac{1}{\gamma \tilde{E}} \tag{12}$$

In an additional embodiment, similar to the previous case, let $\theta = [\tau\alpha]$ represent the vector of unknown signal parameters and $[0, T]$ be the observation interval. The log-likelihood function for $\theta$ can be written as, $$\Lambda(\theta) = c_2 - \sum_{i=1}^K \frac{1}{2\sigma_i^2} \int_0^T [r_{i(t)} - \alpha_i e^{jw_i t} s_i(t-\tau)]^2 \, dt, \tag{13}$$

where $c_2$ represents a constant that is independent of $\theta$. In what follows, ML estimate for $\theta$ can be obtained from (13) as $$\hat{\theta}_{ML} = \arg\max_\theta \sum_{i=1}^K \frac{1}{\sigma_i^2} \int_0^T \alpha_i r_i(t) s_i(t-\tau) \, dt - \sum_{i=1}^K \frac{E_i[\alpha_i]^2}{2\sigma_i^2}, \tag{14}$$

where $$E_i = \int_0^T [s_i(t-\tau)]^2 \, dt$$

is the signal energy.

Using (13), the FIM can be obtained, after some manipulation as $$I_\theta = \begin{bmatrix} I_{\tau\tau} & I_{\tau\alpha} \\ I_{\alpha\tau} & I_{\alpha\alpha} \end{bmatrix}, \tag{15}$$

where the elements of FIM are given by $$I_{\tau\tau} = \sum_{i=1}^K \gamma_i \tilde{E}_i, \tag{16}$$

$$I_{\tau\alpha} = I_{\alpha\tau} = -\sum_{i=1}^K \frac{\alpha \hat{E}_i}{\sigma_i^2}, \tag{17}$$

$$I_{\alpha\alpha} = \sum_{i=1}^K \frac{E}{\sigma_i^2}, \tag{18}$$

where $\gamma_i = \alpha_i^2/\sigma_i^2$, $\tilde{E}_i$ and $\hat{E}_i$ are defined as $$\tilde{E}_i = \int_0^T [s_i'(t-\tau)]^2 \, dt, \tag{19}$$

$$\hat{E}_i = \int_0^T s_i'(t-\tau)s_i(t-\tau) \, dt. \tag{20}$$

From the first row and column element of the inverse FIM in (16), i.e. $[I_\theta^{-1}]$, the CRLB for unbiased time delay estimators can be obtained as $$CRLB_{disp} = \frac{1}{\sum_{i=1}^K \gamma_i(\tilde{E}_i - \hat{E}_i^2/E_i)}. \tag{21}$$

Similar to the previous case, if the channel coefficient is known, the unknown parameter vector reduces to $\tau$. Then, the CRLB can be obtained as $$CRLB_{disp} = \frac{1}{\sum_{i=1}^K \gamma_i \tilde{E}_i}. \tag{22}$$

where $d_l$ is the real data (since a data-aided time delay estimation scenario is considered, the data symbols are assumed to be known) for the lth symbol, and p(t) represents a pulse with duration $T_p$, i.e., p(t)=0 for $t \in [0, T_p]$. For simplicity of expressions, it is assumed that the observation interval T can be expressed as $$T = NT_p. \quad (23)$$

Similarly, let the baseband signal $s_i(t)$ consist of a sequence of modulated pulses as follows:

$$s_i(t) = \sum_l d_{i,l} p_i(t - lT_i), \quad (24)$$

for i=1, ..., K, where $d_{i,l} = d_l$ is the real data for the lth symbol of signal i, and $p_i(t)$ represents a pulse with duration $T_i$, i.e., $p_i(t) = 0$ for $t \in [0, T_i]$. Here, we assume that $d_{i,l} = d_l$, which implies that $d_l$ data, as in case of whole band, is transmitted over each dispersed band. For simplicity of expressions, it is also assumed that the observation interval T can be expressed as $T = N_i T_i$ for an integer $N_i$ for i=1, ..., K.

In order to achieve the same performance, i.e. variance of time delay estimation, in whole and dispersed spectrum utilization systems for a given real data $d_l$, the required condition is derived using (12), (22), (23), (24), and given by $$SNR_{wh} B^2 = \sum_{i=1}^{K} SNR_i B_i^2, \quad (25)$$

where $SNR_{wh}$ and $SNR_i$ are the signal to noise ratio (SNR) for whole band and ith dispersed band methods respectively, and $SNR_{wh}$ is defined as $$SNR_{wh} = \frac{\alpha^2 N d_l^2 E_p}{\sigma^2} \quad (26)$$

with $$E_p = \int_{-\infty}^{\infty} p^2(t) dt.$$

Similarly, $SNR_i$ is defined as $$SNR_i = \frac{a_i^2 N_i d_l^2 E_{pi}}{\sigma_i^2} \quad (27)$$

with $$E_p = \int_{-\infty}^{\infty} p^2(t) dt.$$

It can then be proven that,
$\tilde{E}$ in (12) can be expressed as $$\tilde{E} = 4\pi^2 N d_l^2 E_p \beta^2, \quad (28)$$

where β is the effective bandwidth of p(t), given by $$\beta^2 = \frac{1}{E_p} \int_{-\infty}^{\infty} f^2 |P(f)^2 df|, \quad (29)$$

with P(f) denoting the Fourier transform of p(t). Furthermore, assuming that the spectral density of p(t) is constant over the B, then the relationship between the effective bandwidth β and B can be obtained from (29) as $$B^2 = \frac{B^2}{12}. \quad (30)$$

By substituting (30) into (28), and after some manipulation, (28) takes the following form, $$CRLB_{wh} = \frac{1}{\frac{\pi^2}{3} SNR_{wh} B^2}. \quad (31)$$

Similarly, $\tilde{E}_i$ in (22) can be written in the following form $$\tilde{E}_i = 4\pi^2 N_i d_l^2 E_{pi} \beta_i^2, \quad (32)$$

where $\beta_i$ is the effective bandwidth of $p_i(t)$, given by $$\beta_i^2 = \frac{1}{E_{pi}} \int_{-\infty}^{\infty} f^2 |P_i(f)|^2 df, \quad (33)$$

with $P_i(f)$ denoting the Fourier transform of $p_i(t)$. Similar to the previous case, it is assumed that the spectral density of $p_i(t)$ is constant over the $B_i$, then the relationship between the effective bandwidth of $\beta_i$ and $B_i$ can be obtained from (33) as $$\beta_i^2 = \frac{B_i^2}{12} \quad (34)$$

By substituting (34) into (32), and after some manipulation, (32) takes for the following form, $$CRLB_{disp} = \frac{1}{\frac{\pi^2}{3} \sum_{i=1}^{K} SNR_i B_i^2}. \quad (35)$$

Obtaining the same performance from both whole and dispersed spectrum utilization techniques requires the CRLB of both methods to be equal, i.e. $CRLB_{wh} = CRLB_{disp}$. Therefore, by equating (31) and (35) and after some manipulation, the condition that is stated in the proposition is obtained as $$\frac{1}{\frac{\pi^2}{3}SNR_{wh}B^2} = \frac{1}{\frac{\pi^2}{3}\sum_{i=1}^{K} SNR_i B_i^2}, \quad (36)$$

$$SNR_{wh}B^2 = \sum_{i=1}^{K} SNR_i B_i^2 \quad (37)$$

It is observed that by selecting the appropriate SNR levels and absolute bandwidths for both techniques based on (36), the same CRLB can be achieved, theoretically. However, this may not be the case for the practical case, which is investigated in the following section through computer simulations. Some representative applications of (36) are given as follows. This equation is useful for the selection of the K, $SNR_i$, $B_i$ parameters in dispersed spectrum utilization techniques that can provide the same performance as whole spectrum utilization techniques with SNR and B parameters. It also can be useful to quantify the equivalent K number of dispersed bandwidth ($B_i$) as a whole bandwidth (B) for given $SNR_i$ and SNR, respectively. Finally, (36) is useful for the optimization mechanism in range accuracy adaptation which is a feature of CPSs (cognitive positioning systems). In the range accuracy adaptation method, the objective is to achieve given range accuracy requirements. During the optimization of spectrum parameters, range accuracy adaptation algorithm can select the optimal spectrum parameters (e.g. absolute bandwidth, SNR) using (36).

Figure 5:
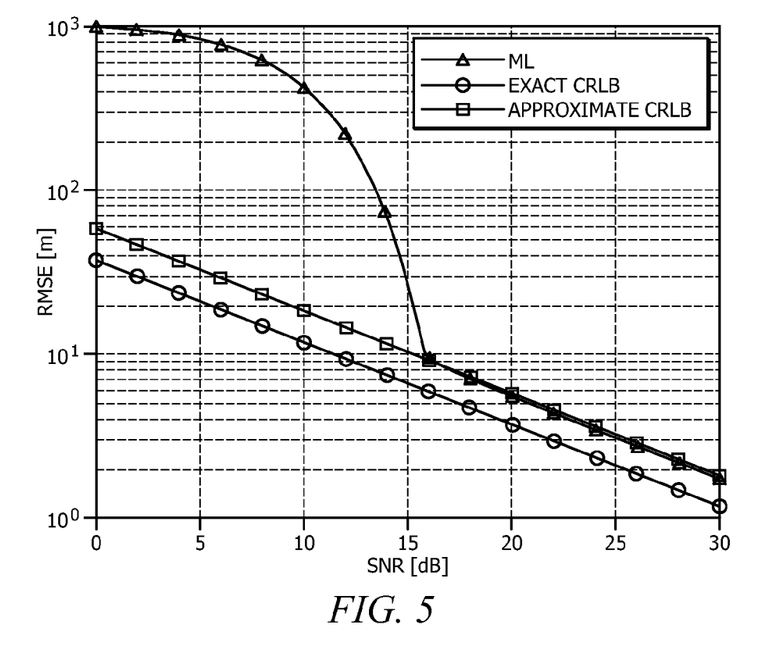
FIG. 5 is a graphical illustration of CRLB and performance of ML time delay estimator for dispersed and whole spectrum utilization methods in accordance with present invention.
Figure 6:
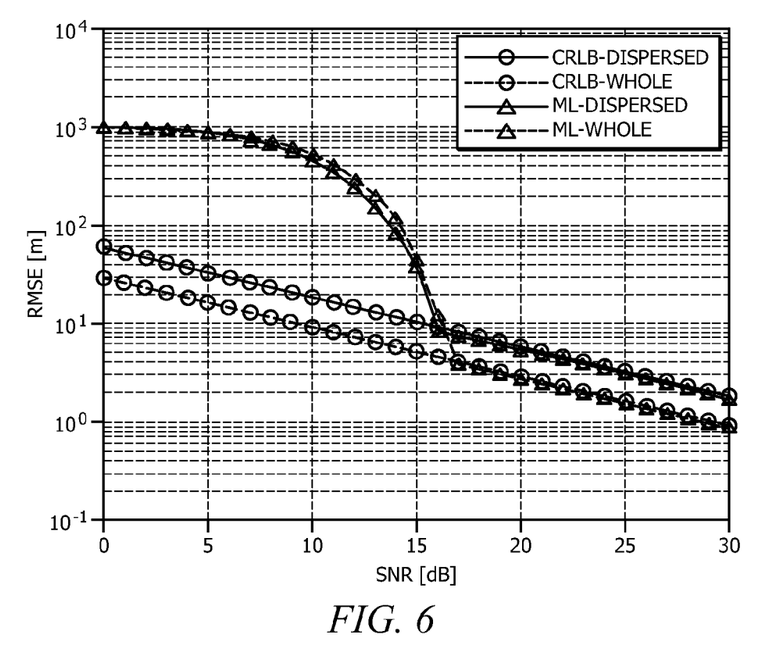
FIG. 6 is a graphical illustration of the performance of ML based range accuracy adaptation in accordance with the present invention.
Figure 7:
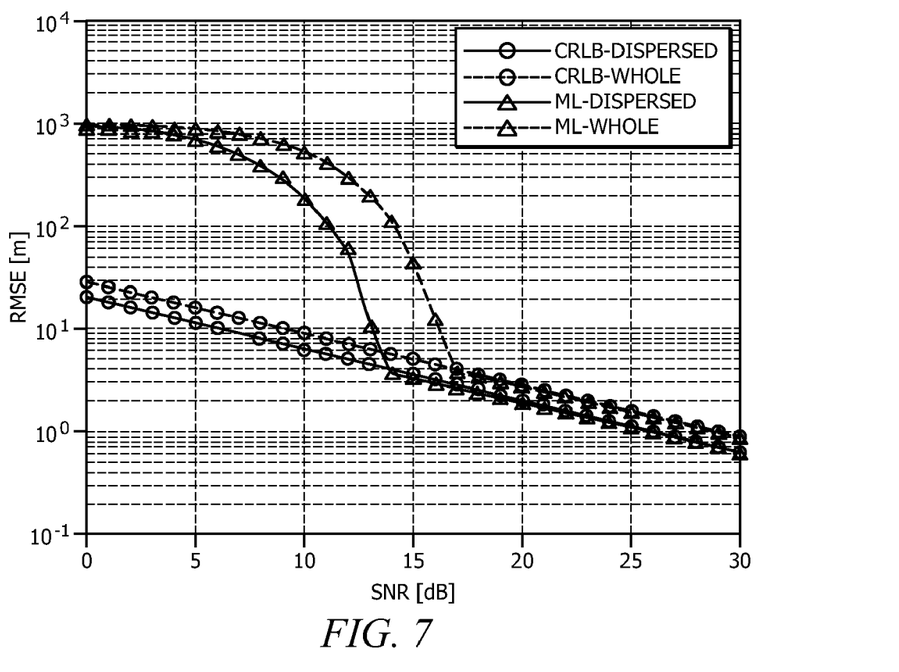
FIG. 7 is a graphical illustration of CRLB for dispersed vs. whole spectrum utilization on a linear scale.
Figure 8:
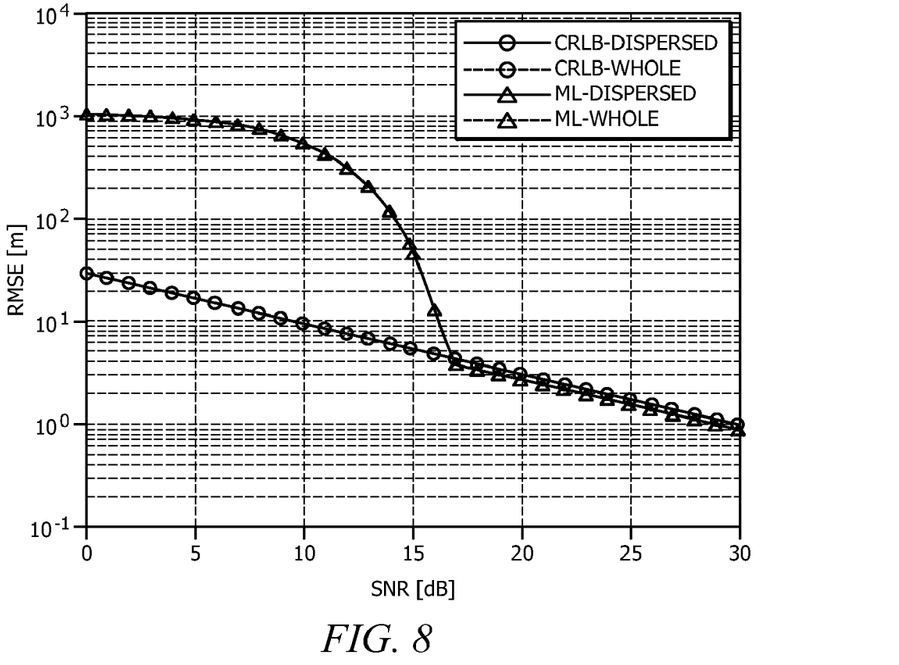
FIG. 8 is a graphical illustration of CRLB for dispersed vs. whole spectrum utilization on a linear scale.

FIG. 5 through FIG. 8 illustrate the simulation results in accordance with the present invention. FIG. 5 is a graphical illustration of CRLB and performance of ML time delay estimator for dispersed and whole spectrum utilization methods in accordance with present invention. FIG. 6 is a graphical illustration of the performance of ML based range accuracy adaptation in accordance with the present invention. FIG. 7 is a graphical illustration of CRLB for dispersed vs. whole spectrum utilization on a linear scale. FIG. 8 is a graphical illustration of CRLB for dispersed vs. whole spectrum utilization on a linear scale.

Combining signals received over dispersed bands at the receiver side is a crucial process and it affects the performance of dispersed spectrum utilization systems. The signals at each branch can be combined using different criterion. In a particular embodiment, maximum ratio combining (MRC) is used to combine the received signals at the receiver It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A cognitive radio transceiver for dispersed wireless spectrum utilization, the transceiver comprising:
    a transmitter comprising a plurality of branches, each of the plurality of branches associated with one of each of a plurality of available dispersed bands in a dispersed wireless spectrum, each of the plurality of branches comprising;
        an upconverter for upconverting a received baseband signal to the carrier frequency associated with the branch;
        a transmitter amplifier for amplifying the upconverted baseband signal; and
        a transmitter bandpass filter for filtering the amplified, upconverted baseband signal;
    a transmitter combiner for combining each of the filtered, amplified, upconverted baseband signals from each of the plurality of branches into a combined signal;
    a transmitter for transmitting the combined signal over a single wideband antenna;
    a splitter for receiving the combined signal and for splitting the combined signal into a plurality of baseband receive signals, each of the plurality of baseband receive signals associated with one of each of the plurality of available dispersed bands;
    a receiver for receiving the plurality of baseband receive signals from the splitter, the receiver comprising a plurality of branches, each of the plurality of branches associated with one of each of the plurality of available dispersed bands in the dispersed wireless spectrum, each of the plurality of branches comprising;
        a receiver bandpass filter for filtering the baseband receive signal;
        a receiver amplifier for amplifying the filtered receive signal; and
        a downconverter for downconverting the plurality of amplified, filtered receive signal;
    a receiver combiner for combining the downconverted, amplified, filtered receive signals from each of the plurality of branches to recover the transmitted baseband signal.

2. The transceiver of claim 1, wherein the plurality of dispersed bands in the wireless spectrum are adjacent to each other.

3. The transceiver of claim 1, wherein the plurality of dispersed bands in the wireless spectrum are non-adjacent to each other.

4. The transceiver of claim 1, wherein the transmitter amplifier is a tunable power amplifier.

5. The transceiver of claim 1, wherein the receiver amplifier is a low noise amplifier.

6. The transceiver of claim 1, further comprising a maximum ration combiner to combine the downconverted, amplified, filtered received signals from each of the plurality of branches to obtain the transmitted baseband signal using maximum ratio combining technique.

7. The transceiver of claim 1, wherein the plurality of branches is equal to K branches, each of the K branches associated with one of each of the plurality of available dispersed bands in the dispersed wireless spectrum.

8. The transceiver of claim 7, wherein the plurality of dispersed bands (K) are selected to satisfy the condition:

$$SNR_{wh}B^2 = \sum_{i=1}^{K} SNR_i B_i^2$$

where $SNR_{wh}$ is the signal-to-noise ratio for the baseband signal when the signal occupies a single band of the spectrum and B is the corresponding bandwidth of the single band; and $SNR_i$ is the signal-to-noise ratio for each of the plurality of baseband signals when the signals occupy the plurality of dispersed bands (K) and B is the corresponding bandwidth of each of the plurality of dispersed bands.

9. The transceiver of claim 7, wherein the K branches are selected from the plurality of available bands of the wireless spectrum such that a predetermined range accuracy ($CRLB_{disp}$) is achieved.

10. The transceiver of claim 9, wherein the predetermined range accuracy ($CRLB_{disp}$) is given by:

$$CRLB_{disp} = \frac{1}{\frac{\pi^2}{3} \sum_{i=1}^{K} SNR_i B_i^2}$$

where, $SNR_i$ is the signal-to-noise ratio for each of the plurality of baseband signals when the signals occupy the plurality of dispersed bands (K) and B is the corresponding bandwidth of each of the plurality of dispersed bands.

11. A method for dispersed wireless spectrum utilization in a cognitive radio transceiver, the method comprising:
selecting a plurality of dispersed bands in a wireless spectrum over which to transmit a baseband signal, each of the plurality of dispersed bands having an associated carrier frequency;
upconverting the baseband signal to the carrier frequency associated with each of the plurality of dispersed bands;
amplifying each of the upconverted baseband signals;
filtering each of the amplified, upconverted baseband signals;
combining the filtered, amplified, upconverted baseband signals;
transmitting the combined signal over a single wideband antenna;
receiving the combined signal from the single wideband antenna;
splitting the received signal into a plurality of baseband receive signals, each baseband receive signal associated with one of each of the plurality of selected available dispersed bands;
filtering each of the plurality of receive signals;
amplifying each of the plurality of filtered receive signals;
downconverting each of the plurality of amplified, filtered receive signals;
combining the downconverted, amplified, filtered receive signals to recover the transmitted baseband signal.

12. The method of claim 1, wherein the plurality of dispersed bands in the wireless spectrum are adjacent to each other.

13. The method of claim 1, wherein the plurality of dispersed bands in the wireless spectrum are not adjacent to each other.

14. The method of claim 1, wherein combining the downconverted, amplified, filtered received signals from each of the plurality of branches to obtain the transmitted baseband signal comprises combining the received signals using maximum ratio combining.

15. The method of claim 1, wherein selecting a plurality of dispersed bands in a wireless spectrum over which to transmit a baseband signal further comprises:
identifying a plurality of available dispersed bands from a plurality of bands in the wireless spectrum; and
selecting the plurality of dispersed bands (K) over which to transmit a baseband signal from the available dispersed bands such that a predetermined range accuracy ($CRLB_{disp}$) is achieved.

16. The method of claim 15, wherein the predetermined range accuracy ($CRLB_{disp}$) is given by:

$$CRLB_{disp} = \frac{1}{\frac{\pi^2}{3} \sum_{i=1}^{K} SNR_i B_i^2}$$

where, $SNR_i$ is the signal-to-noise ratio for each of the plurality of baseband signals when the signals occupy the plurality of dispersed bands (K) and B is the corresponding bandwidth of each of the plurality of dispersed bands.

17. The method of claim 15, further comprising:
selecting a signal-to-noise (SNR) for each of the plurality of dispersed bands; and
selecting an absolute bandwidth for each of the plurality of dispersed bands.

18. The method of claim 15, wherein the plurality of dispersed bands (K) are selected to satisfy the condition:

$$SNR_{wh}B^2 = \sum_{i=1}^{K} SNR_i B_i^2$$

where $SNR_{wh}$ is the signal-to-noise ratio for the baseband signal when the signal occupies a single band of the spectrum and B is the corresponding bandwidth of the single band; and $SNR_i$ is the signal-to-noise ratio for each of the plurality of baseband signals when the signals occupy the plurality of dispersed bands (K) and B is the corresponding bandwidth of each of the plurality of dispersed bands.

* * * * *